United States Patent [19]

Sturm

[11] 3,763,697

[45] Oct. 9, 1973

[54] METHOD AND APPARATUS FOR DETERMINING STRESS

[75] Inventor: Rolland G. Sturm, Huntsville, Ala.

[73] Assignee: Sturm Stress, Inc., Denver, Colo.

[22] Filed: Apr. 15, 1970

[21] Appl. No.: 28,601

[52] U.S. Cl. .................................. 73/88 R, 73/81
[51] Int. Cl. ............................................. G01n 3/40
[58] Field of Search ................ 73/88 R, 88 A, 81, 73/78, 104

[56] References Cited
UNITED STATES PATENTS

| | | | |
|---|---|---|---|
| 1,768,639 | 7/1930 | Shore et al. | 73/81 |
| 2,491,667 | 12/1949 | Kent | 73/81 |
| 3,200,640 | 8/1965 | Ernst | 73/81 |
| 3,435,668 | 4/1969 | Sandwith | 73/88 R |
| 3,256,768 | 6/1966 | Nisida | 73/88 A |
| 3,336,834 | 8/1967 | Bingham et al. | 73/88 A |
| 3,071,963 | 1/1963 | Gunnert | 73/88 R |
| 3,068,688 | 12/1962 | Gunnert | 73/88 R |
| 2,724,964 | 11/1955 | Singdale | 73/88 R |

FOREIGN PATENTS OR APPLICATIONS

| | | | |
|---|---|---|---|
| 1,096,169 | 12/1967 | Great Britain | 73/81 |

OTHER PUBLICATIONS

Akashi Micro Hardness Tester. Advertising Brochure of Akashi Seisakusho, Ltd.
"What –Hardness?"—by S. R. Williams, p. 109 of Scientific American, Sept. 1943
Leitz, Durimet, Small Hardness Tester
Akashi, Micro Hardness Tester

*Primary Examiner*—Jerry W. Myracle
*Attorney*—Newton, Hopkins and Ormsby

[57] ABSTRACT

A method and apparatus for non-destructively determining the total stresses in a body wherein an indentation is made in the surface of the solid body and the internal stresses determine the contour of the resulting permanent indentation as opposed to the contour of the indentation that would have remained if there were no stresses in the body. The difference in such coutours is analyzed to determine the amount of stresses and the orientation of such stresses without the physical destruction of the solid body. The material itself will indicate the total stresses (residual plus load) in the surface of the material, by the characteristics of the deformation or flow of the material under a suitable applied pressure substantially normal to the surface. The apparatus includes an indentor having a carriage and a plunger moveably carried by the carriage. The plunger is provided with a prescribed contoured tip; and a prime mover, capable of applying the same force successively to the plunger, is provided to drive the plunger. A profilometer which can be mounted on the carriage for alternate use with the plunger, reads the contour created by the tip and compares the same with similar indentations made in an unstressed sample.

16 Claims, 22 Drawing Figures

United States Patent [19]
Sturm
[11] 3,763,697
[45] Oct. 9, 1973
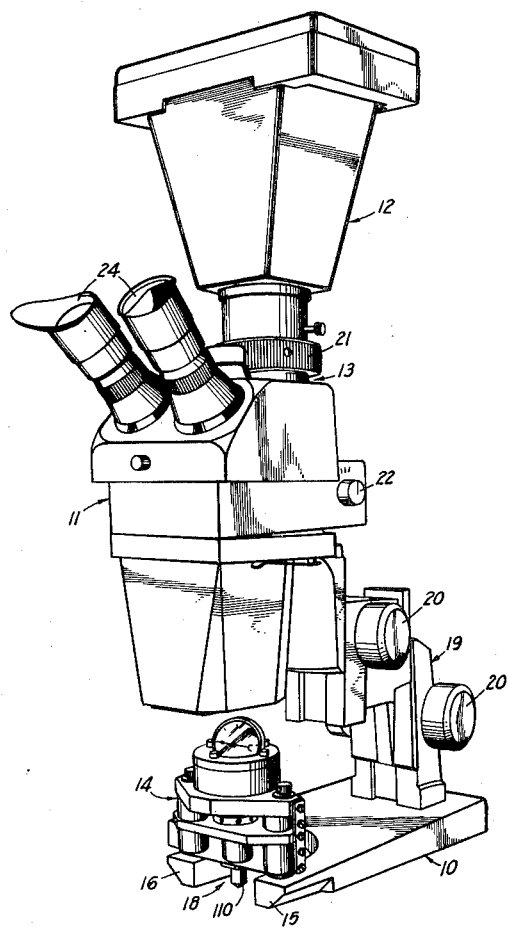

INVENTOR.
ROLLAND G. STURM

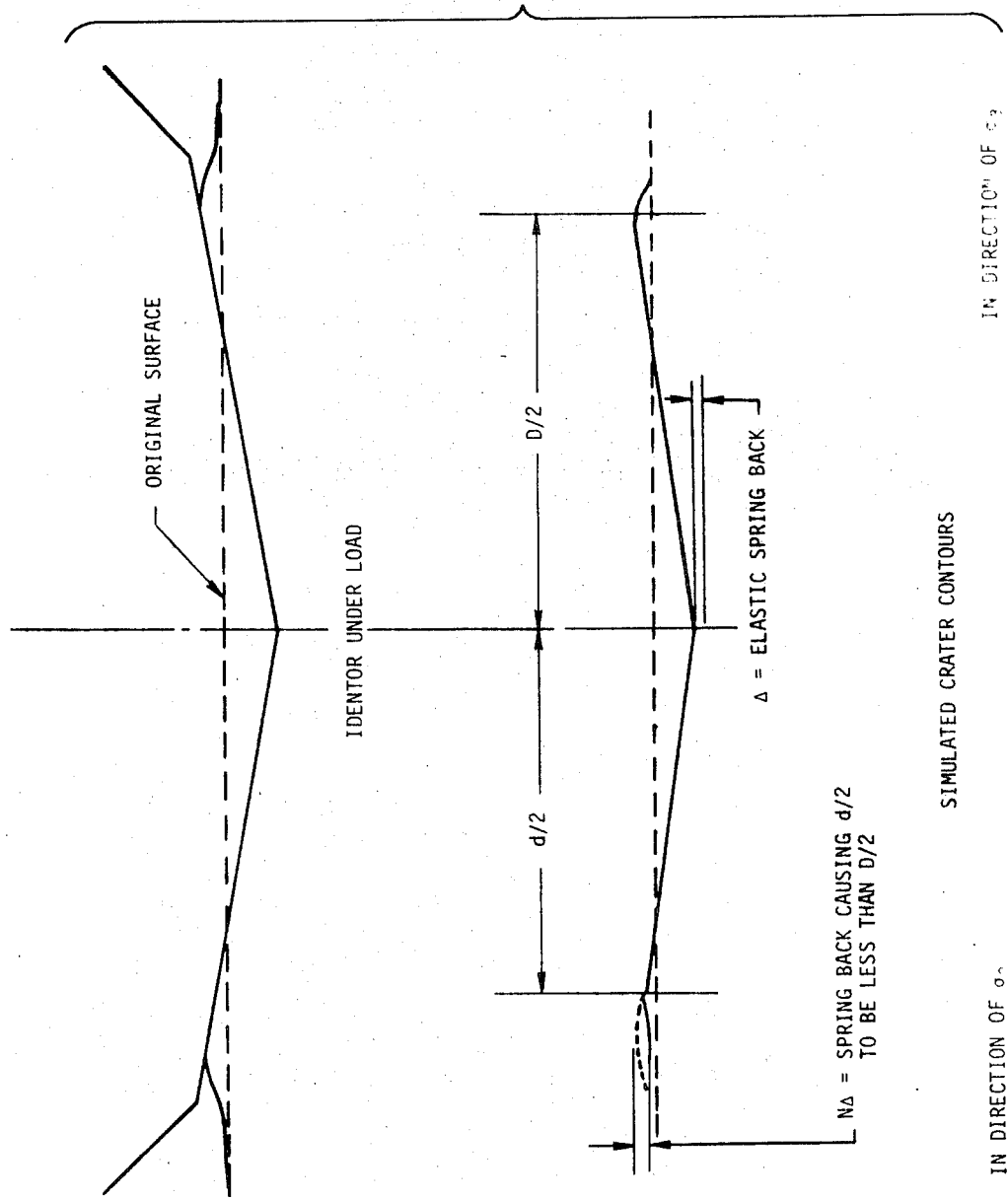

METHOD AND APPARATUS FOR DETERMINING STRESS

BACKGROUND OF THE INVENTION

In the past, it has been necessary in order to measure the total stresses (residual plus load) in a piece of material ie. metal, plastic, or the like, to first determine the stresses due to load by means of suitable strain gages, and then cut the piece of material into smaller pieces and to determine from these smaller pieces the residual stresses which were present prior to the cutting of the original piece. This, of course, destroys the usefulness of the piece of material and, hence, is not a desirable method. Furthermore, such a procedure is expensive and time consuming. Thus, in the past, no suitable method has been devised for non-destructively measuring the total stresses in a body while in a load carrying condition. At best, only predictions as to the stressed conditions were achieved, through stimulation of the structure, by use of photoelastic techniques. The techniques, of course, could not stimulate the actual conditions, particularly where high stresses were present.

SUMMARY OF THE INVENTION

These and other problems associated with prior art stress determining techniques are overcome by the invention disclosed herein in that a technique is provided which non-destructively determines the total stresses in a piece of material whether under load or not. Moreover, the invention provides a technique for determining both the magnitude and orientation of the stresses in the material.

The present invention includes an apparatus having a plunger provided at one end with a precisely shaped hard instrument or tip which preferably is in the form of a smooth uniform conical member having a sharp point. The tip may be in the form of other shapes such as spherical, elipsoidal, hypobolic, polyhedral, etc. Suitable structure is provided for mounting this plunger in a position normal, or tangential, to the material to be tested and for repeatedly or successively applying precisely the same prescribed load to the plunger. The apparatus also has a profilometer includng a sensing device, together with a recording instrument for sensing the contour created as a result of a prescribed load and for recording and comparing that contour with a contour created under similar conditions in a non-stressed sample. By ascertaining the difference in contour between the stressed material and the non-stressed material, quite accurate readings can be taken and the stresses determined both as to magnitude and orientation.

Accordingly, it is an object of the present invention to provide a method of measuring stresses in a material, without destroying or materially damaging the material itself.

Another object of the present invention is to provide a method of measuring the total stresses in a material wherein the stresses may be measured while a load is applied to the material, so as to measure such stresses under actual load conditions.

A further object of the present invention is to provide a method of determining not only the magnitude of stresses within a given material but also the orientation of such stresses.

A still further object of the present invention is to provide an apparatus for successively applying essentially the same force through an indenting tool to a surface of a material to be measured, regardless of surface orientation.

A still further object of the present invention is to provide an apparatus for measuring precisely the characteristics of the indentation made in the surface of the material by the indenting tool.

A still further object of the present invention is to provide a means for adjusting the position of the indenting tool so that the resulting indentation will be located in operative alignment with the apparatus for measuring the characteristics of the indentation.

A still further object of the present invention is to provide a means to alternately and selectively position the indentation tool and the apparatus for measuring the characteristics of the indentation.

A still further object of the present invention is to provide a means to alternately and selectively position the indentation tool and the apparatus for measuring the characteristics of the indentation in operative association with the surface of the material to be tested.

Other objects, features, and advantages of the present invention will become apparent from the following description taken in conjunction with the accompanying drawings, wherein like characters of reference designate corresponding parts throughout the several views.

BRIEF DESCRIPTION OF THE DRAWINGS

FIG. 9 is a schematic drawing illustrating the springback in an indented surface;

Figure 1:
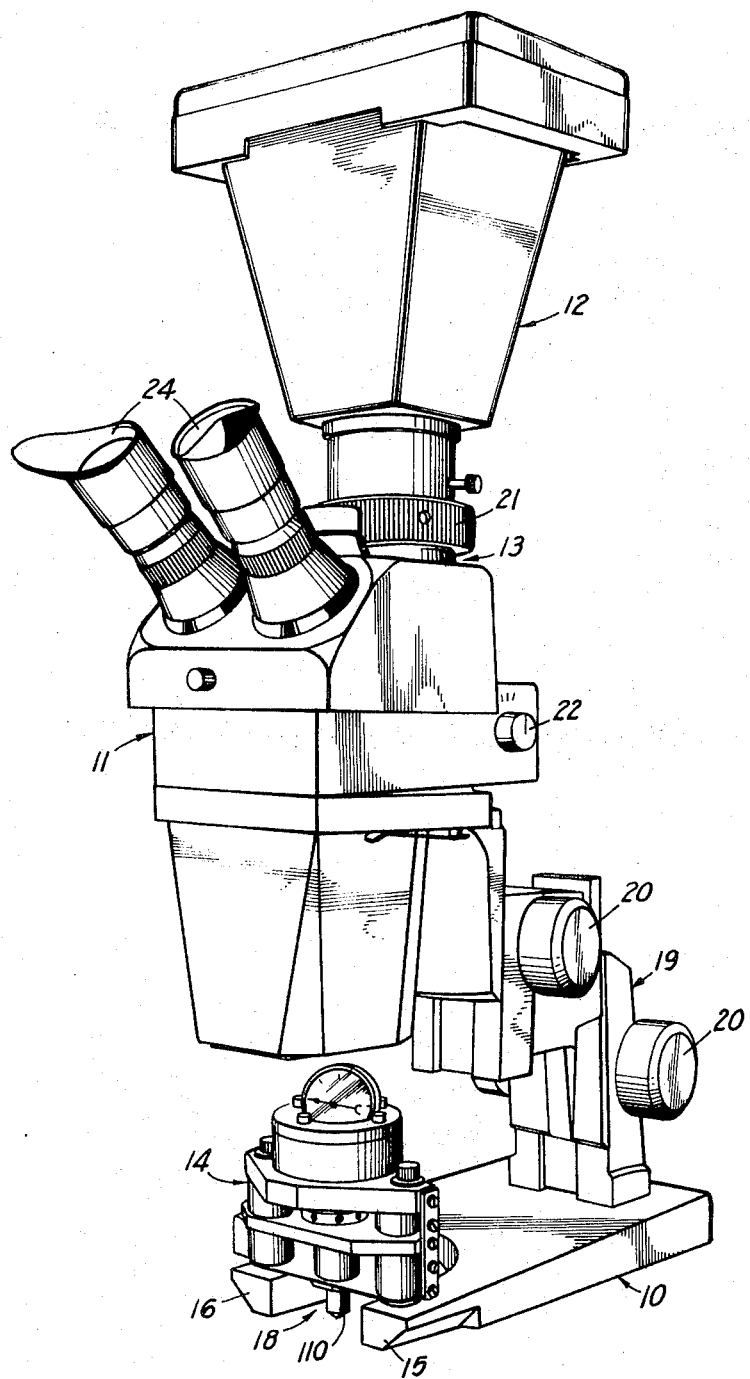
FIG. 1 is a perspective view of the apparatus of the invention with the indention tool in its operative position.

These figures and the following detailed description discloses specific embodiments of the invention, however, it is to be understood that the inventive concept is not limited thereto since it may be embodied in other forms.

DETAILED DESCRIPTION OF THE ILLUSTRATIVE EMBODIMENTS

Referring to FIGS. 1–5, it will be seen that the apparatus of the invention includes a base 10 mounting an indenter 14 and a profilometer 13 thereon. The profilometer 13 is here shown as a microscope 11 with a camera 12. The indenter 14 and microscope 11 may be alternately used, to first make the indentation in the part (not shown) to be tested and secondly to photograph the distorted indentation thus made for comparison to determine the total stress in the part.

The base 10 is bifurcated at the forward end thereof to provide a pair of parallel support legs 15 and 16 which define a tool receiving recess 18 therebetween. The rear end of base 10 mounts a conventional microscope stand 19 with appropriate controls 20 to position the microscope 11 about the inclinable and pivot joints as well as the multiple adjustable slides of the stand 19.

Figure 2:
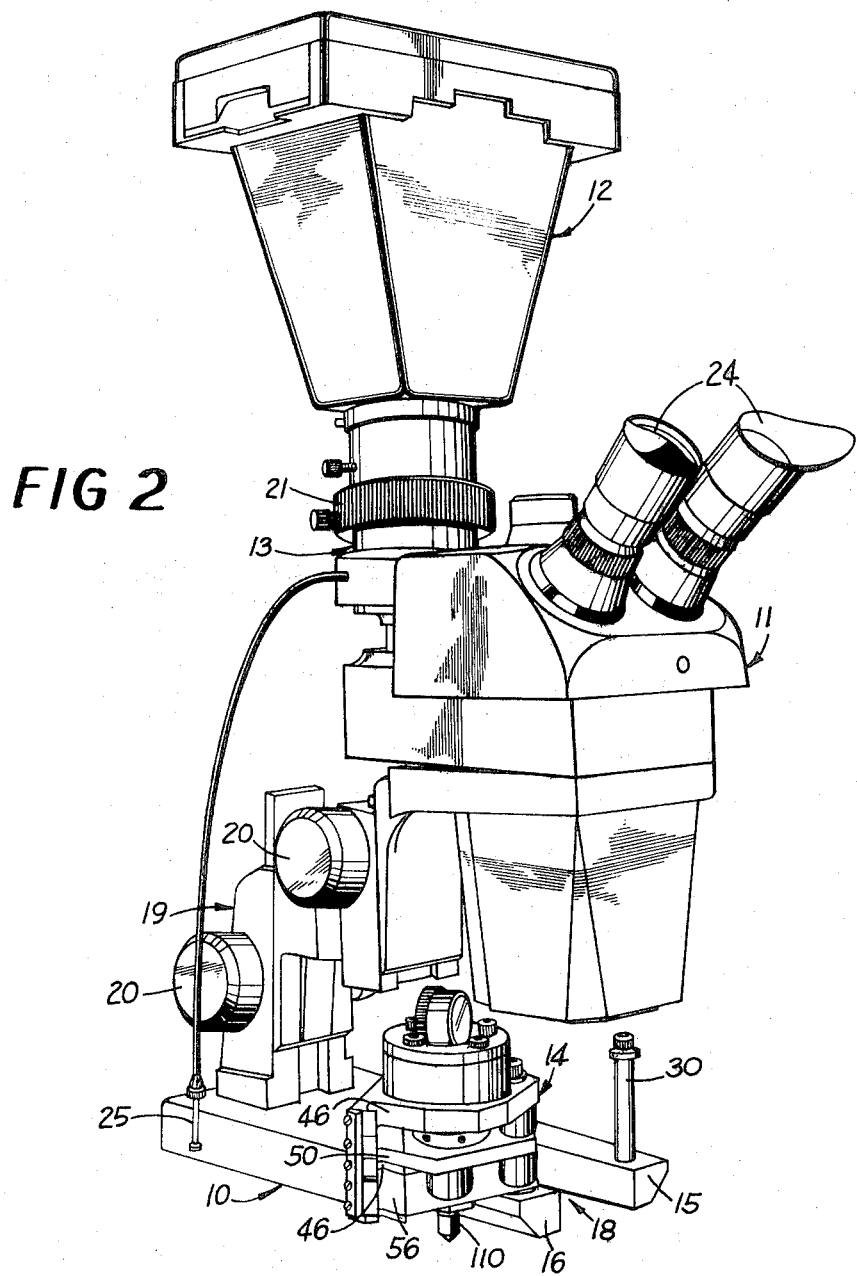
FIG. 2 is a perspective view of the apparatus of FIG. 1 with the microscope and camera in their operative position.

The microscope 11 is of conventional design such as the "Stereozoom" series manufactured by Bausch & Lomb of Rochester, N.Y. with a camera attachment 21 and control 22 for selectively positioning the eyepieces 24 or camera 12 in optical connection through the microscope lens. The camera 12 is also of conventional design such as that manufactured by Polaroid Corporation of Cambridge, Mass., with a shutter control 25 as seen in FIG. 2.

Figure 3:
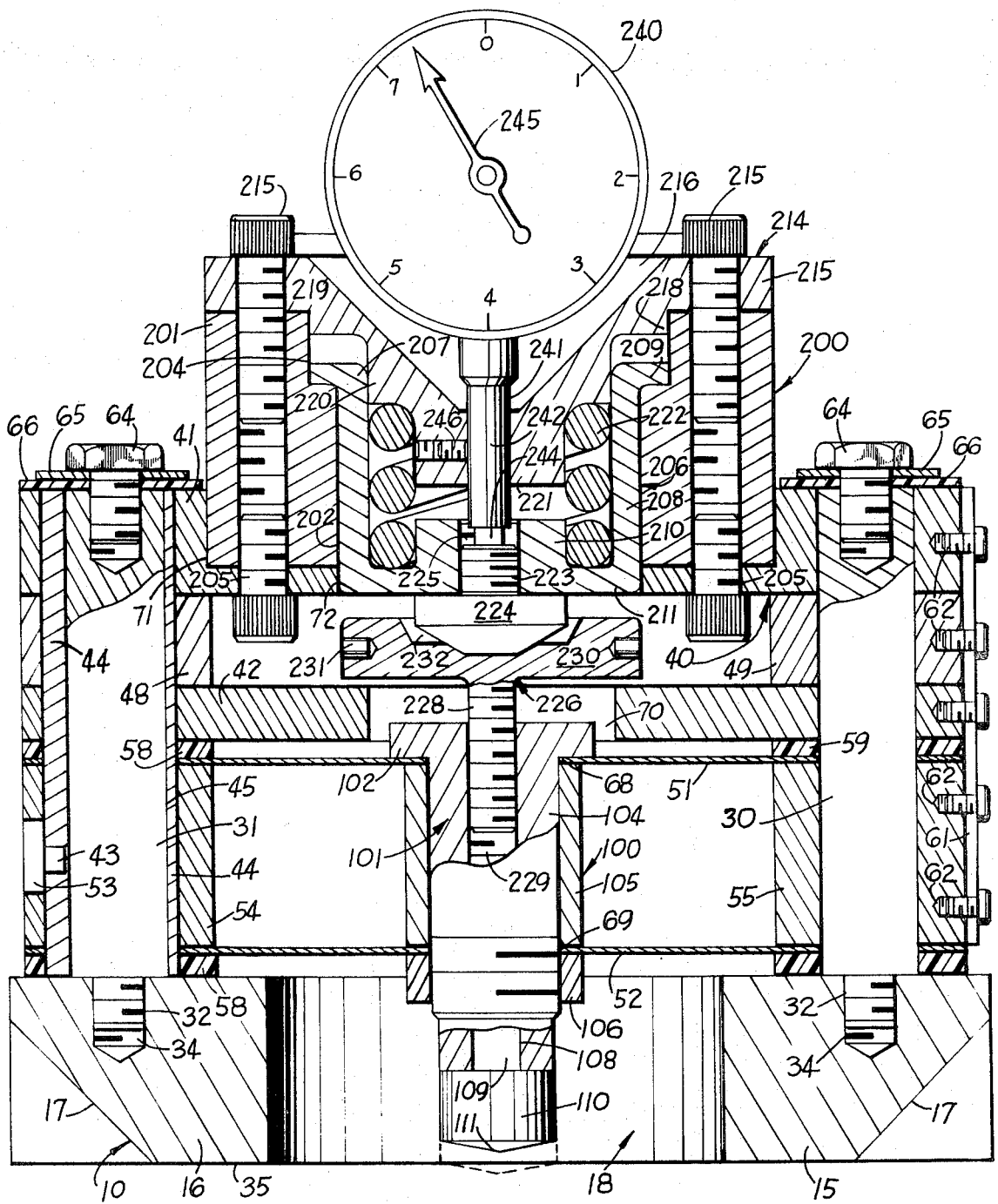
FIG. 3 is an enlarged vertical sectional view of the indention tool.
Figure 4:
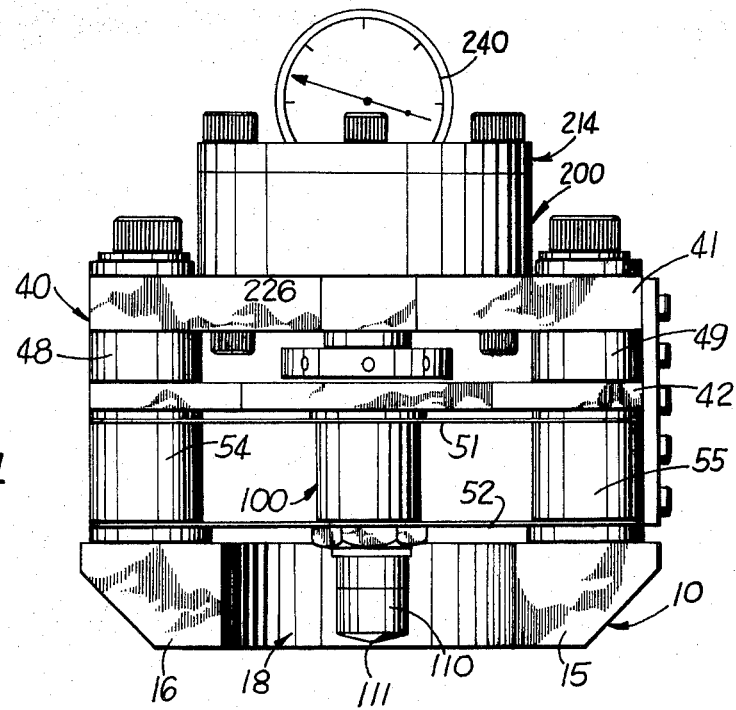
FIG. 4 is an elevational view of the tool.
Figure 5:
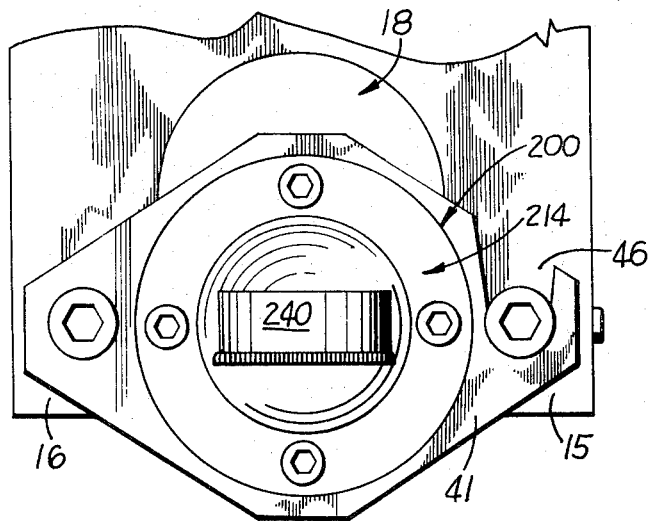
FIG. 5 is a top view of the tool.

Referring particularly to FIGS. 3–5, it will be seen that the indenter 14 is mounted on the extending ends of legs 15 and 16 of base 10 by support pins 30 and 31 respectively. Each of pins 30 and 31 is provided with a threaded stud 32 at the lower end thereof which is threadedly received in holes 34 in legs 15 and 16. Pins 30 and 31, then, are perpendicular to the bearing surface 35 of base 10 which rests on the part to be tested.

Indenter 14 includes a frame 40 with an upper support plate 41 and a lower support plate 42. Plates 41 and 42 are pivotally mounted on pin 31 through an eccentric bushing 44 rotatably mounted around pin 31 by its offset passage 45 extending therethrough parallel to the axis of the bushing 44. The opposite sides of plates 41 and 42 are notched at 46 (see FIG. 2) to receive pin 30 therein when they are pivoted to an operature position as shown in FIGS. 1 and 3–5. The notches 46 pemit the frame 40 to be pivoted to an inoperative position as shown in FIG. 2 whereupon the microscope 11 can be lowered to its operative position and focused on the indention made by indenter 14.

Plates 41 and 42 are held apart by a pair of spacers 48 and 49 so that the plates 41 and 42 are parallel to each other as well as perpendicular to pins 30 and 31. The spacer 48 is positioned around bushing 44 and pin 31 and bushing 49 is notched at 50 similarly to plates 41 and 42 to receive pin 30 therein.

A pair of vertically spaced plate fulcrums 51 and 52 as best seen in FIG. 3 are positioned below the frame 40 and mounted for movement with frame 40 on pins 30 and 31. As is well known, each plate fulcrum 51 or 52 can be deflected in a vertical direction but not in a lateral horizontal direction. The fulcrums 51 and 52 are spaced apart by spacer cylinders 54 and 55. Cylinder 54 is rotatably received about bushing 44 and pin 31 and cylinder 55 is notched at 56 (see FIG. 2) to receive pin 30 similarly to plates 41 and 42. Bearing washers 58 and 59 are positioned above and below fulcrums 51 and 52 to provide for free pivotal movement thereof. Washers 58 encircle bushing 44 between plate 42 and fulcrum 51, and between fulcrum 52 and leg 16 of base 10. Washers 59 are notched similarly to plates 41 and 42 and are positioned between plate 42 and fulcrum 51 about pin 30 as well as between fulcrum 52 and leg 15 of base 10. The fulcrums 51 and 52 have apertures 60 therethrough rotatably receiving bushing 44 therethrough and are notched for receipt of pin 30. A connector beam 61 having apertures therethrough through which fasteners 62 extend, connect the extending ends of plates 41 and 42 as well as spacer 48 and cylinder 55 to hold them together along with fulcrums 51 and 52 and washers 59 about pin 30. Additionally, screws 63 attach washers 49 and fulcrums 51 and 52 to cylinder 55.

The frame 40 and fulcrums 51 and 52 are held in position by bolts 64 threaded into the upper ends of pins 30 and 31. Members 65 positioned by bolts 64 hold the frame 40 and fulcrums 51 and 52 with washers 66 to provide for free pivotal movement of frame 40 and fulcrums 51 and 52 about pin 31.

Centrally carried by fulcrums 51 and 52 is an indention assembly 100. Assembly 100 includes a cylindrical plunger 101 with a retaining flange 102 about the upper end thereof as seen in FIG. 3. The body 104 of plunger 101 is slidably received through fulcrums 51 and 52, respectively. Apertures 68 and 69 are vertically aligned so that the axis of plunger 101 is perpendicular to the surface 35 of base 10. A hollow cylindrical casing 105 is received about plunger 101 and is positioned between fulcrums 51 and 52 to space them apart. A nut 106 is threaded onto the lower end of plunger 101 to clamp fulcrums 51 and 52 with casing 105 therebetween between the flange 102 and nut 106. This positively locates plunger 101 for vertical movement as fulcrums 51 and 52 flex but prevents its movement in the lateral horizontal directions.

The lowermost protruding end of plunger 101 defines a cylindrical centrally located passage 108 therein which slidably receives the locating pin 109 of tip 110. Tip 110 depends below the end of plunger 101 and includes a conical point 111 which actually makes the indention in the part being tested. The tip 110 shown is a diamond, however, other materials may be used therefor. The included angle of the point 111 is shown as 135°, however, it is to be understood that other included angles may be used with the greater included angles resulting in greater measuring sensitivity. The point 111 may also be of a different shape such as spherical, elliptical or polyhedral.

The lower support plate 42 defines a passage 70 therethrough vertically aligned with apertures 68 and 69 in fulcrums 51 and 52 of a diameter sufficiently large for the flange 102 to freely pass therethrough. Therefore, as the plunger 101 is moved up and down, the flange 102 extends into and out of opening 70 so that the point 111 of tip 110 can be moved into engagement with the part to be tested to make an indentation therein.

A positioning and indicator assembly 200 is centrally carried by upper support plate 41 to engage the plunger 101 to position same. The assembly 200 includes an annular abutment 201 carried in an upwardly opening recess 71 centrally located in plate 41. Annular abutment 201 defines a central bore 202 therethrough vertically aligned with opening 70 through plate 42 and a passage 72 of like diameter is defined through plate 41 in alignment with bore 202. Abutment 201 defines an upwardly opening counterbore 204 therein about the upper end of bore 202. Bolts 205 extending from the underside of plate 41 threadedly engage abutment 201 to hold same in position in recess 71.

Slidably received in bore 202 is a driving cup 206 having an annular body 208 with an outwardly extending flange 209 around the upper end of body 208. Body 208 is slidably received in bore 202 while flange 209 is slidably received in counterbore, 204 to arrest the downward movement of cup 206 upon engagement of flange 209 with shoulder 207 defined by the junction of bore 202 and counterbore 204. Cup 206 is provided with an upstanding boss 210 at its lower end connected to body 208 by annular web 211. The boss 210, web 211 and the lower ends of body 208 define an annular spring receiving cavity 212.

An annulus 214 is carried by abutment 200 and extends within body 208 of cup 206 to guide same as it reciprocates in bore 202 of abutment 200. Annulus 214 includes an annular lip 215 which rests on top of abutment 200 and defines a cone-shaped recess 216 therein. A shoulder 218 fits within the top of counterbore 204 to close same and define a cavity 219 in conjunction with depending shoulder 220 of annulus 214 and annulus 200 for slidably receiving shoulder 209. Depending below shoulder 220 is a guide projection 221 having the same diameter as upstanding boss 210 and a compression coil spring 222 is received about projection 221 and bos 210. Spring 222 is supported between shoulder 220 and web 211 so that it constantly urges cup 206 downwardly.

An anvil 224 is threaded into a central passage 225 through boss 210 and extends below cup 206. A driving member 226 is positioned between and connects anvil 224 with plunger 101. Member 226 includes a depending threaded stud 228 threadedly received in a centrally located hole 229 in the upper end of plunger 101 and a driving wheel 230 having a diameter larger than opening 70 through plate 42 is integral with the upper end of stud 228. A plurality of wrenching pockets 231 are spaced about the periphery of wheel 230 and a recessed seat 232 is defined in the top of wheel 230 to receive anvil 224. Wheel 230 is positioned between plates 41 and 42 so that a wrenching member (not shown) may be inserted into pockets 231 to rotate wheel 230 and thread stud 228 into and out of hole 229.

When the indenter 14 is ready for use, the wheel 230 is rotated to screw stud 228 into hole 229. This causes the underside of wheel 230 to engage the upper surface of plate 42 and lift plunger 101 and tip 110 since fulcrums 51 and 52 flex upwardly. As soon as point 111 has been raised above the level of surface 35, the apparatus can be placed on the body to be tested.

When the apparatus is placed on the body to be tested and clamped into position, the wheel 230 is oppositely rotated to retract stud 228 and attempt to raise drive member 226. Since anvil 224 is urged downwardly by spring 222, the retraction of stud 228 causes plunger 101 to be moved downwardly. As the rotation of wheel 230 is continued point 111 eventually contacts the body being tested whereupon spring 222 forces the point 111 into the part to form an indentation I (shown in phantom lines in FIG. 3). When the spring force is overcome by the reaction of the body being tested, the cup 206 is raised.

For indicating the amount of movement of cup 206, a dial gauge 240 is mounted in annulus 214. Gauge 240 includes a depending support tube 241 which is slidably received in a centrally located passage 242 through projection 221. The movable indicator shaft 244 of gauge 240 depends below tube 241 and rests on the upper end of stud 223 of anvil 224 so that any movement of shaft 244 produces a corresponding movement in indicator hand 245. The gauge 240 is held in position be set screw 246 carried in projection 221. Wheel 230 is rotated until hand 245 is moved to zero each time the apparatus is used to insure that the same force is applied to the body each time it is tested provided the apparatus is firmly clamped to the body by known means.

The legs 15 and 16 are beveled as at 17 in order for base 10 to be more easily attached to objects being tested.

Once the indentation I is made, the tip 110 is retracted and the indenter 14 is pivoted to its inoperative position as shown in FIG. 2. The microscope 11 and camera 12 are then lowered to a point where the microscope 11 is focused on the indentation I by manipulating controls 20 and sighting through eyepieces 24. When the microscope 11 is properly focused, control 22 is manipulated to place camera 12 in view through the microscope lens. Shutter 25 is then activated to take a picture of the indentation I.

For aligning tip 110 in the field of view of microscope 11, the eccentric 44 may be rotated by a tool (not shown). The tool is inserted through aperture 53 in cylinder 54 and into depression 43 in eccentric 44. The tool is then rotated to drive the eccentric 44.

INTRODUCTION — BASIC CONCEPT

Solid materials consist of an assembly of atoms and-/or molecules either as compounds or mixtures. If the atoms or molecules are ordered, i.e., arranged in a definite pattern, they are generally known as crystalline. Sometimes the molecules are arranged in long chains as polymers.

If most of the crystals or long chain molecules are oriented in a given direction (as when stretched or rolled in one direction), the structure of the material is said to have a preferred orientation. If the atoms or molecules are not ordered, the material is said to be amorphous.

Most metals are comprised of small crystals randomly oriented. These crystals are called grains. The size of the crystals or grains affects the mechanical properties of the material. Between these grains are minute amounts of amorphous materials which may be quite different in composition from the crystallites. The composition of this amorphous material will also affect the properties of the solid.

As the shear stress in a single crystallite is increased, the arrangement of the atoms or molecules becomes distorted until slip occurs. Since most metals are made up of many randomly oriented imperfect crystallites with amorphous material in the interstices between the grains, the start-stop action of plastic deformation is generally diffused and slip occurs more or less gradually. In cases of severely preferred orientation or large grains or single crystals, slip may occur suddenly.

For small strains, theory indicates that the direction of shear slip in a plane is the same as the direction of the maximum shear stress in that plane. For larger strains, crystalline rotation sometimes takes place, giving rise to segments of the total body and changing their orientations by being displaced without being distorted. Since the occurrence of imperfections or discontinuities in and among the grains has been found to be generally of random orientation, a state of shear on a plane at a point in a body (such as an octahedral plane) results in shear strain which may be expected to occur in the direction of the maximum shear stress in that plane. Cases of materials whose crystallites have a high degree of orientation may be, but are not necessarily, exceptions to this generality.

A consideration of the stresses on octahedral planes so oriented that the directions of the principal stresses are the principal axes of the octahedron provides a means of determining the direction of deformation slip for a given state of stress. If, however, the discontinuities within the grains or between the grains are large enough, the material will not slip but will fail in a brittle fracture before significant strains take place. The determination of the magnitude of the discontinuities (microcracks) to cause fracture is the goal of Fracture Mechanics.

The magnitude of the shearing stress required to cause slip on the octahedral planes is dependent on the normal stress on these planes.

These variant experiences indicate that the degree of dependency of the shear stress (causing the start of slip) on the normal stress may be different for different materials.

One simple way to account for the effect of the pressure on a shear surface is to use a linear relationship. This method may not be entirely adequate, but it works. This relationship is $$\tau_0 = \overline{\tau}_0 - K \sigma_n \qquad (1)$$

where $\tau_0$ = the octahedral shear, causing slip for any state of stress $\overline{\tau}_0$ = the octahedral shear, causing slip on an octahedral plane when the state of stress is one for which the normal stress $\sigma_n = 0$ $K$ = a coefficient, depending upon the material considered.

The values of K and $\overline{\tau}_0$ may be determined from data from a tension test and a compression test.

The values of $\tau_0$ and $\sigma_n$ for any state of stress represented by the three principal stresses, $\sigma_1$, $\sigma_2$, and $\sigma_3$, may be derived from solid geometry. These values are $$\sigma_n = (\sigma_1 + \sigma_2 + \sigma_3)/3 \qquad (2)$$

and $$\tau_0 = \tfrac{1}{3}[(\sigma_1 - \sigma_2)^2 + (\sigma_2 - \sigma_3)^2 + (\sigma_3 - \sigma_1)^2]^{1/2} \qquad (3)$$

The angle that the octahedral shear stress, $\tau_0$, makes with the horizontal base of the fundamental octahedron is given by $$\tan \beta = (1/3^{1/2})[(2\sigma_1 - \sigma_2 - \sigma_3)/(\sigma_2 - \sigma_3)] \qquad (4)$$

Experience has shown that the total stress determines the strength or life of a machine or structure. The presence of "residual" or "locked in" stresses in machine parts or structures at points of appreciable load stresses may be disastrous. This condition is particularly true for highly stressed parts subject to repeated or pulsating loads.

Because of this potential for disaster from residual stresses, as well as the natural curiosity of man, the desire to be able to measure the magnitude and direction of residual stresses has been persistent. To be able to measure the total stress without unloading the parts of cutting them has long been a challenge, particularly to engineers.

Residual stresses are not always bad; they may be very helfpul if they are compressive at critical places. Residual stresses from shrink fits, autofrettage, and peening are examples of beneficial residual stresses. Many parts or assemblies are able to carry great service loads or pressures because of the presence of residual stresses. The fatigue life of threads may be increased significantly by peening the surface to produce compressive stresses at the thread bottoms. Glass is heat-treated to produce residual compressive stress in the surface of the part, which results in a total strength several fold greater than for parts not so treated.

A consideration of the mechanics involved reveals that if compressive residual stresses exist in a part, tensile stresses also exist. The engineering problem is to produce known residual stresses favorably distributed in the load carrying parts and to determine and control fortuitous residual stresses. To do this, the residual stresses must be measured or computed when possible.

THEORY OF MEASUREMENT

In most cases residual stresses can be measured in magnitude, sense, and direction without destroying or appreciably weakening the part studied. With this information an adequate analysis of the load-carrying capacity of the part may be made. The effectiveness of corrective measures to increase or decrease the magnitude or change the directions of residual stresses may be evaluated. The effectiveness of stress-relieving large parts or assemblies may be quantitatively monitored.

The process of measuring total stresses (residual plus load stresses) is to let the stressed material itself indicate the stresses locked into the surface of the part. By effectively observing the response of the material to an externally applied stress normal to the surface studied, a quantitative indication of the total stress may be determined. Inasmuch as the surface of the part is usually available, this surface may be tested to give a measure of the total stresses present in it.

One may visualize that, if a compressive stress of sufficient magnitude is applied to a small area of the surface, a small but real plastic deformation will occur. The magnitude and direction of this plastic deformation will depend upon the stresses in the surface layers of the part as well as upon the stress applied normal to the surface.

Figure 6:
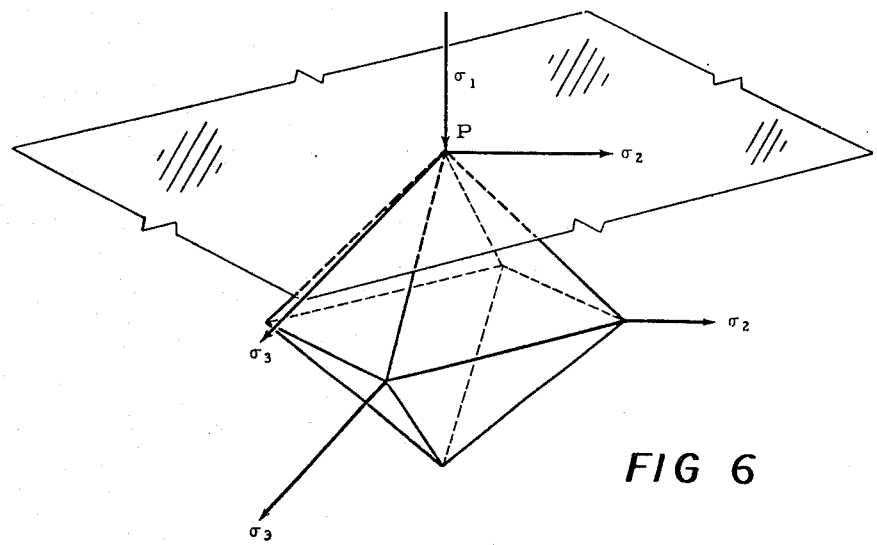
FIG. 6 is a schematic drawing illustrating an infinitesimal octahedron model lying at the surface of a solid body.

In FIG. 6, which represents an infinitesimal octahedron lying at the surface of the material of a solid part, $\sigma_2$ and $\sigma_3$ represent the principal stresses in the surface of the part being tested. The term $\sigma_1$ is the stress applied to the small area P. If $\sigma_1$ is sufficiently large to cause plastic flow in the material, the area of the resulting dent at P will be finite. By judicious control of the force producing $\sigma_1$, the size of the dent can be kept as small as desirable. Too small a dent may occur on or between individual grains of the material. Too large a dent may cause undesirable concentration points for subsequent stressing in service or may lose sensitivity of definition.

For this analysis, the maximum octahedral shear stresses will be used as the criteria for determining the occurrence of flow or plastic deformation in the material. The octahedral normal stress, $\sigma_n$, resulting from the principal stresses $\sigma_1$, $\sigma_2$ and $\sigma_3$, is given in Eq. 2 and the corresponding value for the octahedral shear stress, $\tau_0$, is given by Eq. 3.

The octahedral shear strains, $\gamma_0$, and dilation, $\epsilon_0$, resulting from the principal stresses, $\sigma_1$, $\sigma_2$, and $\sigma_3$, are given by the following equations:

$$\gamma_0 = \tfrac{2}{3}[(\epsilon_1 - \epsilon_2)^2 + (\epsilon_2 - \epsilon_3)^2 + (\epsilon_1 - \epsilon_3)^2]^{1/2} \tag{5}$$

and $$\epsilon_0 = (\epsilon_1 + \epsilon_2 + \epsilon_3)/3 \tag{6}$$

From the direct correspondence between strain $\epsilon_1$ in the direction of $\sigma_1$, strain $\epsilon_2$ in the direction of $\sigma_2$, and strain $\epsilon_3$ in the direction of $\sigma_3$, it follows that $\gamma_0$ is in the direction of $\tau_0$.

Figure 7:
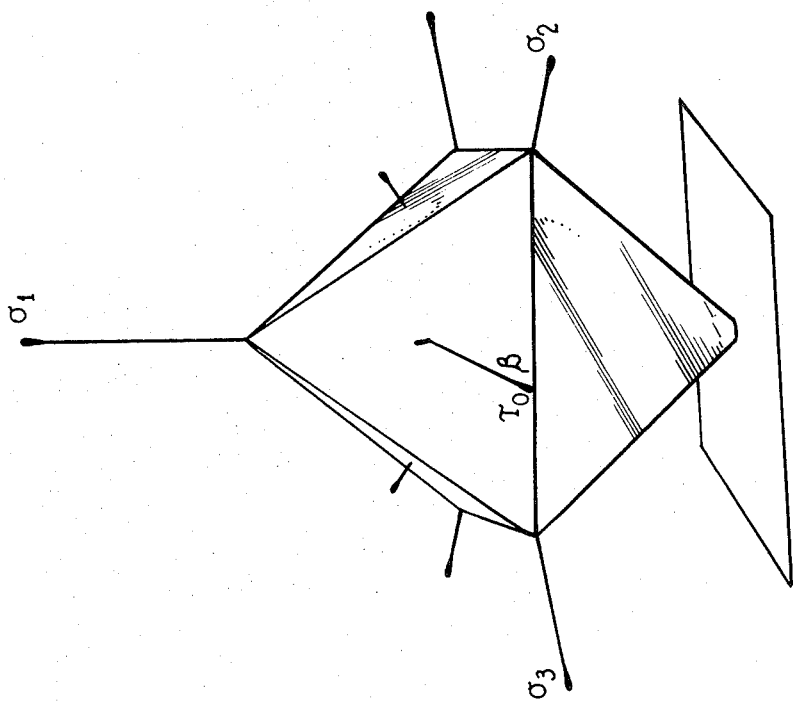
FIG. 7 is a photograph of a model representing the octahedral planes in a body.

FIG. 7 is a photograph of a model representing the octahedral planes emanating from point P. The shear stresses, $\tau_0$, are represented by vector sticks lying in the octahedral planes; and the normal stresses, $\sigma_n$, are represented by vector sticks normal to the planes. Careful scrutiny will reveal the difference between vector and shadow.

Figure 8:
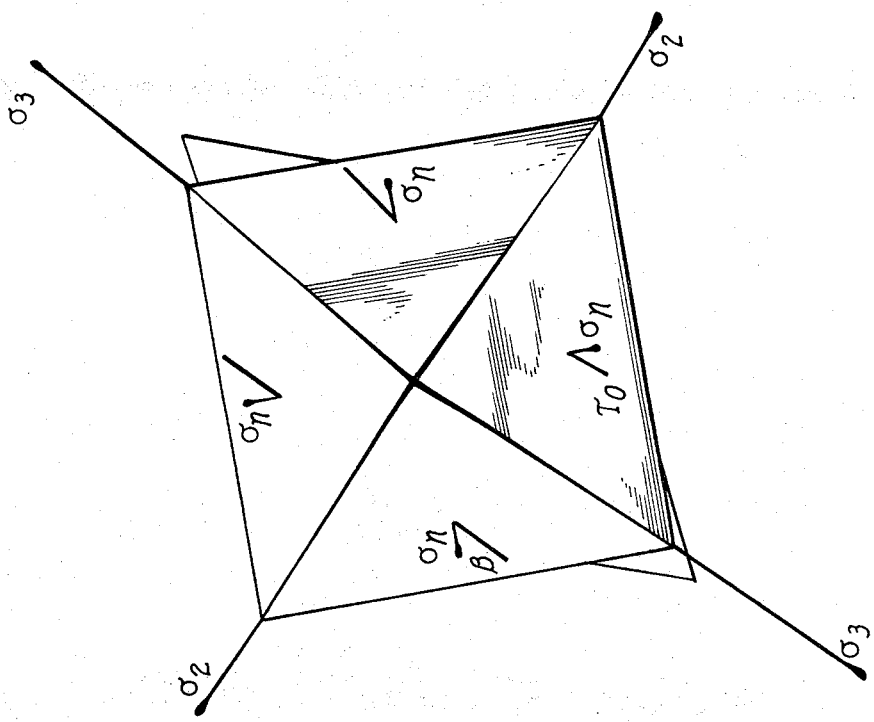
FIG. 8 is another photograph of the model of FIG. 7.

FIG. 8 is a photograph showing a face of the octahedral model taken so as to show the direction of the shear stress. If $\beta$ represents the angle between the shear stress vector and the base of the octahedral triangle, the value of the tangent of $\beta$ may be computed from Eq. 4 as $$\tan \beta = \frac{1}{(3)^{1/2}} \left[ \frac{(\sigma_3 + \sigma_2) - 2\sigma_1}{\sigma_3 - \sigma_2} \right]. \tag{7}$$

Refer again to FIG. 7, which shows vectors computed for the case of $\sigma_3 > \sigma_2$ and both are tension. The shear vectors indicate that the shear strains will be in a direction predominantly toward the maximum tensile stress in the part being tested.

When an indentation is formed, the flow of the material beneath the conical point of the indentor will be greatest in the direction of the maximum tensile stress. When the indentor is removed, the relative springback or elastic recovery of the material will be less in this direction than at 90° to the direction of the maximum tensile stress at point P in the surface of the part.

The value of $\sigma_1$ causing plastic flow may be found from Eq. 3 in terms of $\tau_0$, $\sigma_2$, and $\sigma_3$. The following equation results:

$$\sigma_1 = (\sigma_2 + \sigma_3)/2 - (3)^{1/2}/2)[6(\tau_0)^2 - (\sigma_3 - \sigma_2)^2]^{1/2} \tag{8}$$

When $\sigma_2$ and $\sigma_3$ are both positive (tensile stresses), the value of $\sigma_1$, required for flow of the material, is smaller than when $\sigma_2$ and $\sigma_3$ are zero. In other words, the indentor will make a larger detent. The area of the dent is proportional to the product of the maximum and minimum diameters. Therefore, the product of the two diameters may be calibrated against the sum of the two principal stresses, $\sigma_2$ and $\sigma_3$.

If the value of $\sigma_1$ from Eq. 8 is substituted into Eq. 4, the resulting equation is $$\tan \beta = [6(\tau_0)^2 - (\sigma - \sigma_2)^2]^{1/2}/(\sigma - \sigma_2) \tag{9a}$$

or $$\tan \beta = [6 - (\sigma_3 - \sigma_2)^2/\tau_0^2]^{1/2}/[(\sigma_3 - \sigma_2)/\tau_0] \tag{9b}$$

From FIG. 8 it is apparent that if tangent $\beta$ becomes smaller the direction of shear stress (and shear strain) will be inclined more in the direction of the maximum tensile stress and, correspondingly, the maximum diameter of indentation will be greter than the minimum by a greater margin. Thus the ratio of maximum diameter, D, to the minimum diameter, d, exceeds unity by a greater amount and may be represented by $(D/d - 1)$.

The quantity $(D/d - 1)$, therefore, may be calibrated against the difference in principal stresses expressed in terms of $\tau_0$ for the material, i.e., $(\sigma_3 - \sigma_2)/\tau_0$.

From an application point of view, the average value of $\sigma_1$ can be obtained from the applied load, W, and the area of the indentation, $(\pi Dd)/4$, as $$\sigma = -4W/\pi Dd$$

When there is no stress in the surface of the material studied, the initial diameters are essentially equal, or $D_0 = d_0$. Thus $$(\sigma_1)_0 = -4W/\pi D_0^2 \quad \text{or} \quad W = -\pi D_0^2 \sigma_{10}/4$$

In Eq. 8 when there is no stress in the surface of the material studied, $\sigma_2 = \sigma_3 = 0$, from which $$(\sigma_1)_0 = (-3^{1/2}/2)6^{1/2}\tau_0 = (-3/2^{1/2})\tau_0 \tag{10a}$$

When $\sigma_2$ and $\sigma_3$ are not zero, $$\sigma_1 = -4W/\pi Dd = (-D_0^2/Dd)(\sigma_1)_0 = (-3/2^{1/2})(D_0^2/Dd)\tau_0 \tag{10b}$$

Substitution of the value of $\sigma_1$ from Eq. 10b into Eq. 8 gives $$(-3/2^{1/2})(D_0^2/Dd)\tau_0 = (\sigma_2 + \sigma_3)/2 - (3^{1/2}/2)[6(\tau_0)^2 - (\sigma_3 - \sigma_2)^2]^{1/2}$$

from which $$\frac{-3}{(2)^{1/2}} \frac{D_0^2}{Dd} = \left(\frac{\sigma_2 + \sigma_3}{2\tau_0}\right) - \frac{(3)^{1/2}}{2}\left[6 - \left(\frac{\sigma_2 - \sigma_3}{\tau_0}\right)^2\right]^{1/2}$$

and $$\left(\frac{\sigma_2 + \sigma_3}{2\tau_0}\right) + \frac{3}{(2)^{1/2}} \frac{D_0^2}{Dd} = \frac{(3)^{1/2}}{2}\left[6 - \left(\frac{\sigma_2 - \sigma_3}{\tau_0}\right)^2\right]^{1/2}. \tag{11}$$

If $\sigma_3 = \sigma_2$, Eq. 11 is simplified to $$(\sigma_2 + \sigma_3)/2\tau_0 + (3/2^{1/2})D_0^2/Dd = \pm 3/2^{1/2}$$

or $$(\sigma_2 + \sigma_3)/2\tau_0 = (-3/2^{1/2})(D_0^2/Dd) \pm 1.$$

For our purpose the minus sign applies and $$\frac{\sigma_2+\sigma_3}{2\tau_0} = \frac{-3}{(2)^{1/2}}\left(\frac{D_0^2}{Dd}-1\right) = \frac{3}{(2)^{1/2}}\left(1-\frac{D_0^2}{Dd}\right).$$

(12)

If K in Eq. 1 is zero, it follows that $\bar{\tau}_0 = \tau_0$. If K is not zero, the value of $\tau_0$ may be evaluated by using the value of $K = 0$ and correcting the values for K using Eq. 1 and Eq. 12 as discussed later in this paper.

If $\sigma \neq \sigma_2$, then by expanding the bracketed value in Eq. 11 by the binominal theorem and using only two terms, it follows that $$(\sigma_2 + \sigma_3)/2\tau_0 = 3/2^{1/2}(1 - D_0^2/Dd - [1/4(2)^{1/2}][\sigma_3 - (\sigma_2)/\tau_0]^2$$

(13)

With suitable calculation the value of $(\sigma_3 + \sigma_2)/\tau_0$ may be related to the value of $(1 - D_0^2/Dd)$. Here $D_0$ is the diameter of the indentation obtained at a point of the part where the stress is zero and $Dd$ are the maximum and minimum diameters of the indentation in stressed material. If no point on the part tested has known zero stresses, an unstressed piece of the same material may be tested to determine $D_0$.

Also, with suitable calibration coordinated with suitable calculations, the value of $(\sigma_3 - \sigma_2)/\tau_0$ has been found to be directly related to the quantity $(D/d - 1)$.

The direction of the maximum positive stress, $\sigma_3$, is obtained directly as the direction of the maximum diameter of the indentation. Tests indicate that the ratio, $(\sigma_3 - \sigma_2)/\tau_0$, may be expressed as $$\sigma_3 - \sigma_2/\tau_0 = M(D/d - 1)$$

(14)

and from Eq. 13, it follows that $$(\sigma_3 + \sigma_2)/2\tau_0 = (3/\sqrt{2})(1 - D_0^2/Dd) - (M^2/4\sqrt{2})(D/d - 1)^2$$

(15)

The value of M may be evaluated directly from test.

EVALUATION

An analytical approach to an evaluation of M is through the Boussinesq type of analysis for a semi-infinite body loaded locally. The deflection, $\Delta$, at the boundary of a circular area under uniform load, is $$\Delta = (4/\pi)[(1-\mu^2)/E]qa$$

(16)

where
$q$ — intensity of load
$a$ — radius of the loaded area
$E$ — modulus of elasticity for the loaded material.

In this consideration, however, it is the springback when the load is removed that is of significance.

In the direction of the maximum principal stress, $\sigma_3$, which is the general direction of slip on the octahedral planes under the combined effect of residual stresses and the applied pressure, the elastic springback upon release of the applied pressure is found to be practically nil, leaving a crater rim in that direction. The elastic springback at the diameter at the right angles to this direction is found to be greater than the average elastic springback, as is the case of an overstressed beam. The same characteristics may be expected of the radial deflections. Thus the differential elastic springback in the direction of $\sigma_2$ may be appreciably greater than the average elastic deflection, but still very much less than the total elastic plus plastic deformation. Quantitatively it is found to depend upon the shape of the true stress-true strain curve of the material in the body being studied.

To evaluate the constant M in Eq. 14 we may consider any special case such as $\sigma_3 = -\sigma_2$. From the circumstance that a condition of flow cannot exist before the indentor pressure is applied, it follows that the value of $\sigma_1$ necessary to cause flow can be found from Eq. 8.

This value, for the case considered, is $$\sigma_1/\tau_0 = (-3^{1/2}/2[6-(2\sigma_3/\tau_0)^2]^{1/2}.$$

(8a)

If a value of $\sigma_3/\tau_0 = 0.5$ is chosen,
the value of $\sigma_1/\tau_0 = -1.94$ or $\sigma_1 = -1.94\tau_0$
Now $\sigma_n = (\sigma_1 + \sigma_2 + \sigma_3)/3 = (-1.94 - 0.50 + 0.50)/3$
$\tau_0 = -1.94\tau_0/3$.

The values of $\sigma_1$ and $\sigma_n$ may be expressed in terms of the material invariants, $\bar{\tau}_0$ and K, by use of Equation 1, which may be written in terms of the above values as $$\tau_0 = \bar{\tau}_0 - K\sigma_n = \bar{\tau}_0 - K[(-1.94/3)\tau_0]$$

(1a)

Thus for this case $$\tau_0(1 - 0.647K) = \bar{\tau}_0$$
$$\tau_0 = \bar{\tau}_0/(1 - 0.647K)$$

(1b)

Using this value it follows that $$\sigma_1 = -1.94\bar{\tau}_0/(1 - 0.647K) \text{ and } \sigma_n = -0.647\bar{\tau}_0/(1 - 0.647K)$$

When the pressure is released the average springback, normal to the surface which was indented, should correspond to $\Delta$ for an average pressure, $a = \sigma_1$ and the net radius over which the springback occurs may be taken as $D/2$ as shown in FIG. 9.

As discussed above, the springback on the minor diameter may be evaluated as a factor, N, times $\Delta$. N will no doubt vary with the quantity $(\sigma_3 - \sigma_2)/\tau_0$.

Thus from Eq. 16 it follows that $$N\Delta = (4N/\pi) \times [(1-\mu^2)/E] \times [1.94\bar{\tau}_0/(1-0.647K)] \times (D/2)$$

(18)

From the geometry of the diamond indentor point having an apex angle of $2\alpha$, it follows from FIG. 4 that the elastic recovery, $N\Delta$, causes $d$ to be smaller than D by an amount $$D - d = 2N\Delta \cot(90° - \alpha)$$

(19)

By substitution of the value of $N\Delta$, from Eq. 18, into Eq. 19, it follows that $$D - d = (4N/\pi)\,[(1 - \mu^2)\,1.94\,\bar{\tau}_0\,D \cot(90-\alpha)/E\,(1 - 0.647K)]$$

$$(D-d)/d = (4N/\pi)\,[(1 - \mu^2)\,1.94\bar{\tau}_0 \cot(90-\alpha)/E(1 - 0.647K)]\,D/d \quad (20)$$

This equation may be written as $$(D/d) - 1 = Q(D/d) \quad (20a)$$

where $$Q = [4N\,(1-\mu^2)\,1.94\,\bar{\tau}_0 \cot(90-\alpha)/\pi \times E\,(1 - 0.647K)]$$

from which $$(D/d) - 1 = Q/(1-Q) \quad (20b)$$

Now from Eq. 14 it follows that $$M\,[(D/d) - 1] = 2\sigma_3/\tau_0 = 2 \times 0.5 = 1.0$$

or $[(D/d) - 1] = 1/M = Q/(1-Q)$ $$M = (1/Q) - 1 \quad (14a)$$

When this is substituted into Eq. 20 it follows that $$M = [\pi E(1 - 0.647K)/7.76N(1-\mu^2)\bar{\tau}_0 \cot(90-\alpha)] - 1 \quad (21)$$

The value of M or the value of N can be determined from calibration.

This equation shows that

M involves the properties of the material tested, i.e.,
Modulus of Elasticity, E
Internal Friction Coefficient, K
and $\bar{\tau}_0$ as defined in Eq. 1.

M also involves the apex angle ($2\alpha$) of the conical indentor tip.

The numerical value of M can be determined by calibration tests for given material.

CALIBRATION

Two equations are developed invoving the diameters of indentations made in the polished plane surface of the piece being studied for stresses in its surface and the mean diameter of indentations made in the polished plane surface of the same material containing no stress. A constant M dependent upon the modulus of elasticity of the material, the apex angle of the indentor cone, and the load applied to the indentor appears in the equations.

These equations are $$(\sigma_3 - \sigma_2)/\tau_0 = M\,(D/d - 1) \quad (14)$$

and $$(\sigma_3 + \sigma_2)/2\tau_0 = 3/\sqrt{2}\,(1 - D_0^2/Dd) - M^2/4\sqrt{2}\,(D/d - 1)^2 \quad (15)$$

The constant M is expressed as $$M = \pi E(1 - 0.647K)/7.76\,\mathrm{Tan}\,\alpha\,(1 - \mu^2)(\bar{\tau}_0)N \quad (21)$$

where $\sigma_3$ = algebraic maximum stress in the surface of the material
$\sigma_3$ = stress at right angle to $\sigma_3$ in the surface of the material
$D$ = maximum diameter of indentation
$d$ = minimum diameter of indentation
$D_0$ ≙ the diameter of an indentation in a sample where the stress is zero
$E$ = modulus of Elasticity of the material
$\bar{\tau}_0$ = octahedral shearing flow stress for the material when there is no normal stress on the octahedral planes (determined from test)
$K$ = internal friction coefficient for the material (determined from test)
$\alpha$ = one-half of the apex angle of the indentor
$N$ = a coefficient to be determined by experimental calibration if M is not determined directly
$\mu$ = Poisson's ratio.

In the following calibration, the value of M is determined directly from experimental data.

The procedure of the calibration was to determine $D_0$ for the unstressed material and then determine D and d for one or more conditions of tension and of compression. After these measurements were completed, the properties of the material in tension and compression were determined.

The piece of material used was a steel bar, ⅝ × ⅝ × 8¼ inches.

The diamond indentor point was ground and polishd to a cone with a 135° apex angle.

Indentations were made in polished areas of the bar in an unloaded condition and the dents photographed through a microscope with a camera.

Figure 10:
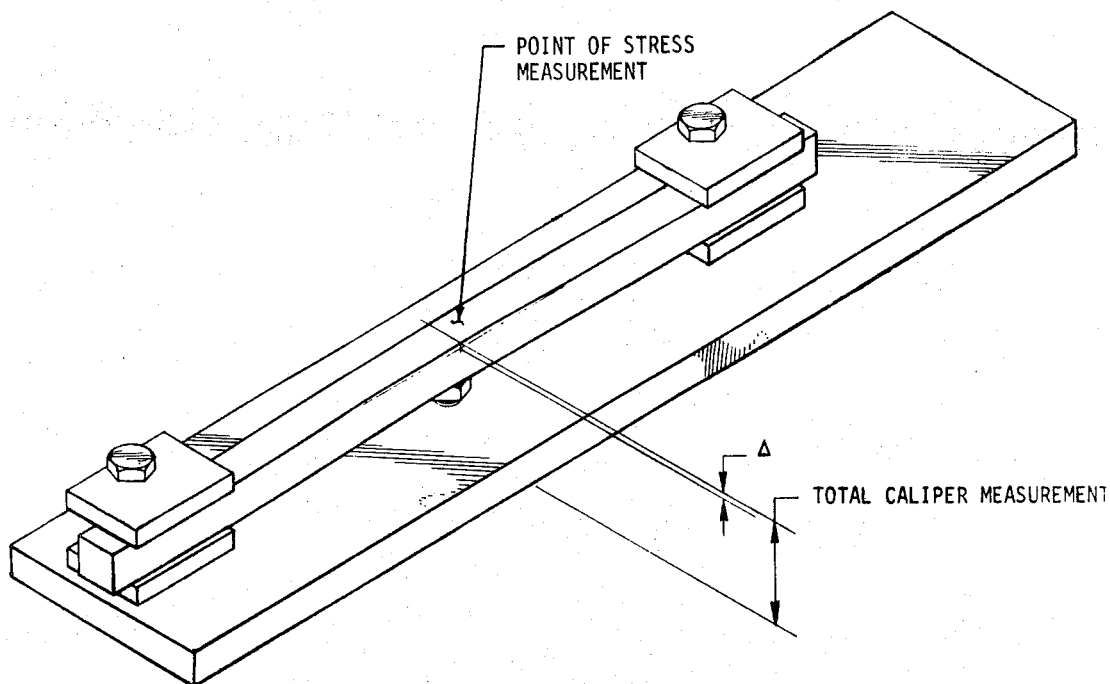
FIG. 10 is a perspective drawing of a jig used in determining tensile stress.

The bar was then loaded as shown in FIG. 10 so as to put the top surface in tension and indentations made in the polished area near the center of the span. The indentations in the stressed material were photographed through the same microscope using the same camera setup as before. It was found that great care was needed to be sure nothing had changed in the photographic setup between the photographs of the dents in the unstressed piece and the photographs of the dents in the stressed piece.

The tensile stress in the top surface of the piece at the center was computed from the deflection of the center span relative to the ends, taking into account the deflection of the loading bar which was ½ × 2¾ inches in cross section by 16 inches long.

If the deflection is taken as the change in gap, $\Delta$, as shown in FIG. 10 the tensile stress is computed to be $$S_T = 12\Delta E C_T/[L^2(1 + I_1/I_2)] = 12\Delta E C_T \quad (22)$$

where $L$ = Span length, 8 inches
$I_1$ = Moment of Inertia of test bar
$I_2$ = That for holding bar
$C_T$ = Half thickness of test bar.

If E is taken as $30 \times 10^6$ psi $$S_T = 1.00\Delta_T \times 10^6.$$

Figure 11:
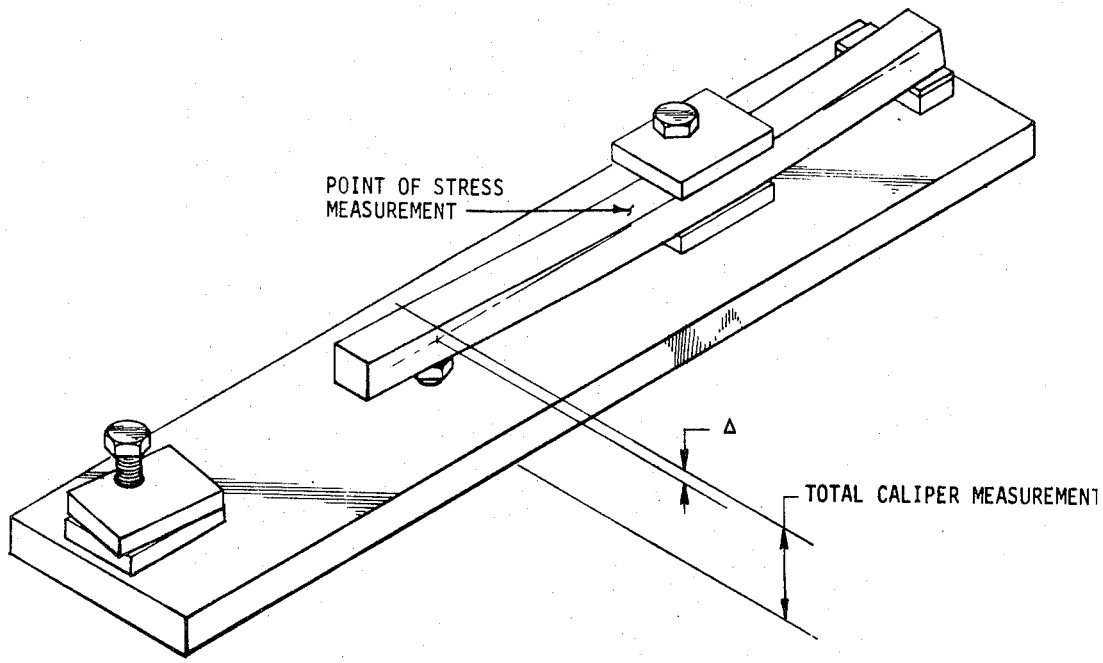
FIG. 11 is a perspective drawing of a jig used in determinging compressive stress.

Compressive stress in the top surface of the beam was obtained as shown in FIG. 11. For this case the value of L is 7.5

$$S_c = 1.13\Delta \times 10^6$$

where $\Delta_c$ is measured as indicated in FIG. 11.

Two values of tensile stress and two values of compressive stress were used.

Figure 12:
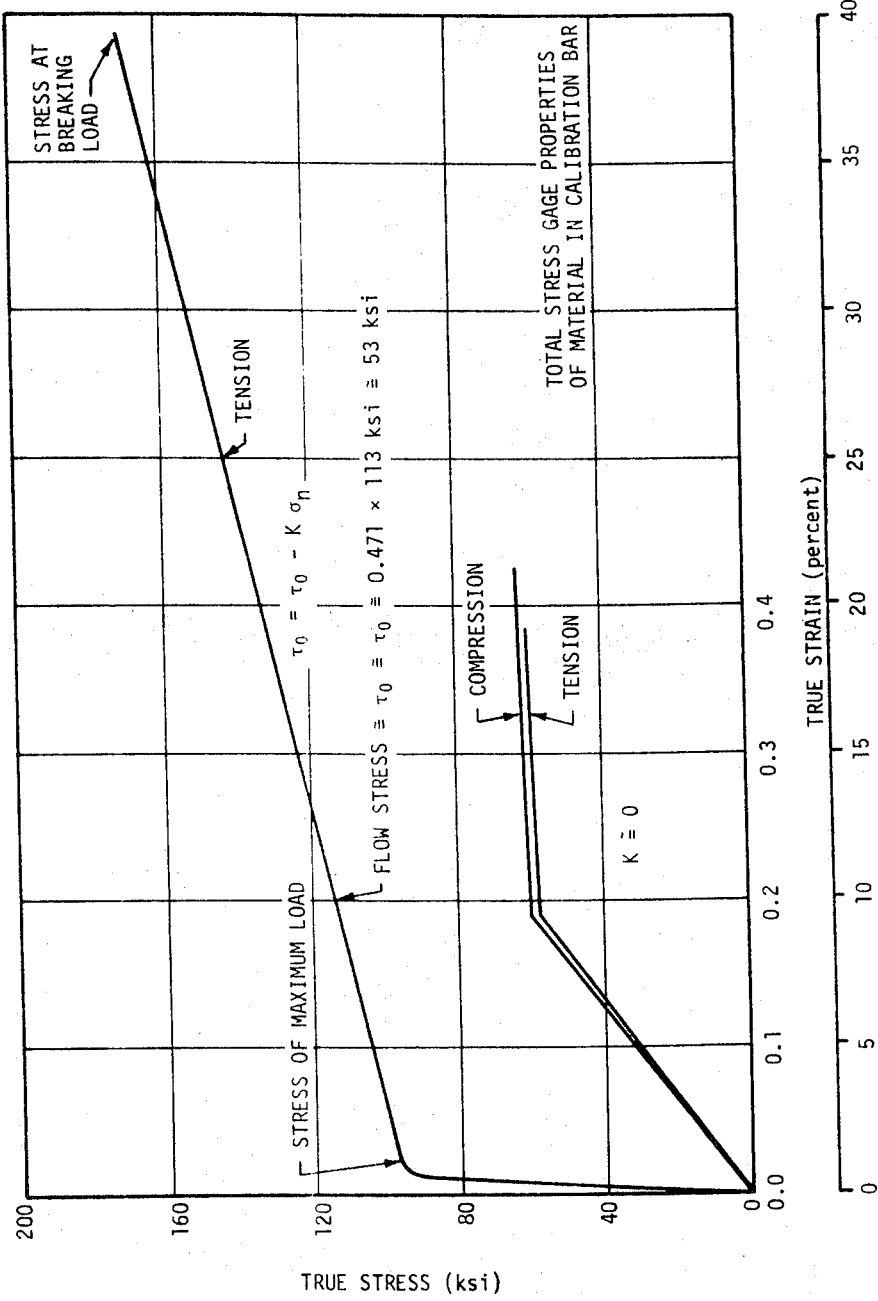
FIG. 12 is a chart illustrating the stress and strain curves in a calibration bar.
Figure 13:
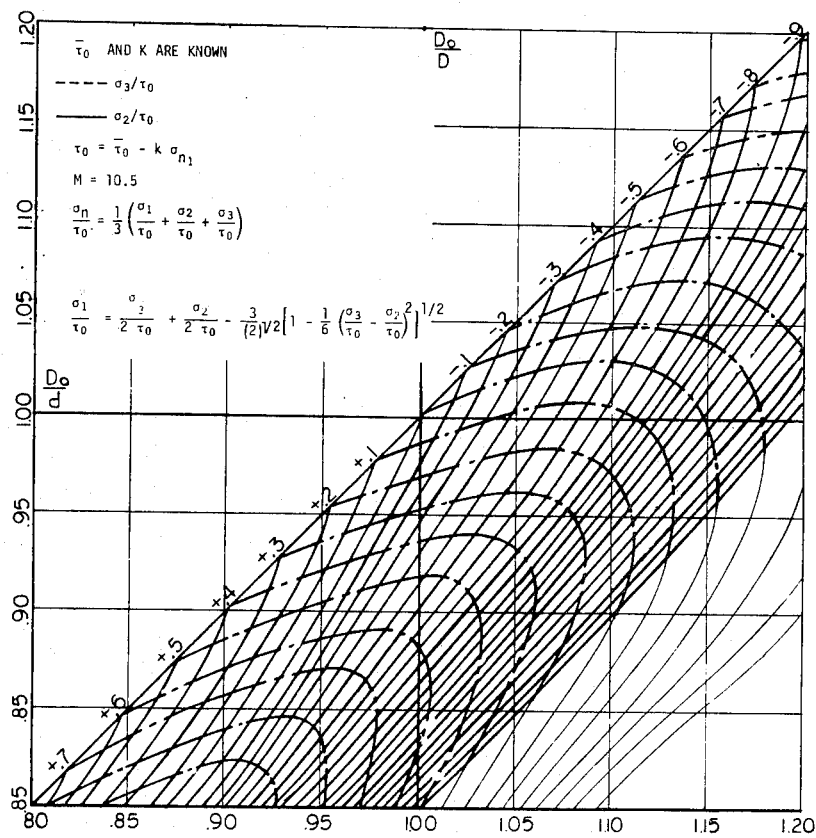
FIG. 13 is a chart correlating the diameter of the indentation in a body with the stress therein; and, FIGS. 14–22 are photographs of enlarged indentations made for determining the total stress in a body.

A true stress-true strain curve for the material is shown in FIG. 12. For quick checking the chart shown in FIG. 13 may be used.

MEASURED VALUES

A. TENSION

For zero stress, the dents were photographed with the same microscope-camera setup as for photographing the dents in the bar stressed to 22,000 psi tension (computed from deflection measurements). The diameters of the photographs of the dents were measured with micrometer calipers which could be read to ±0.001 inch, but the edges of the image of the dents on the photographs were not sharp enough to justify readings closer than ±0.005 inch.

The magnification of the microscope-camera combination was approximately 100 to 1, but, since the same set was used for photographing the dents in the stressed and in the unstressed material, the actual magnification was not needed.

The diameters measured for 22,000 nominal tensile stress are $$D_0 = (1.880 \text{ and } 1.905) \ 1.892 \text{ in. average}$$

Figure 14:
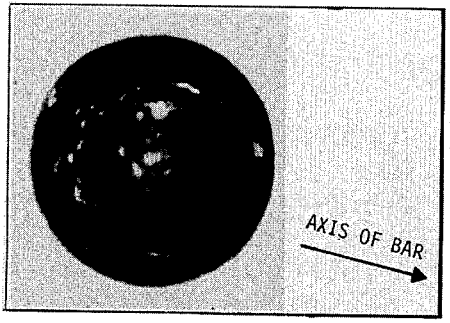
Figure 16:
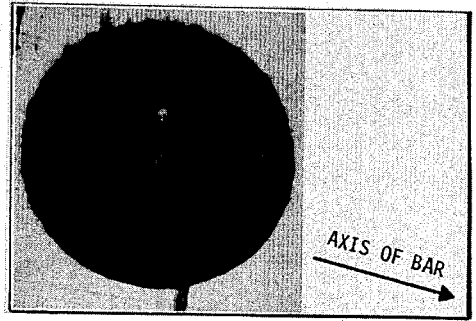

As shown in FIG. 14, the diameters of the dents for zero stress were not perfectly round. The photographs of the indentions for the stressed are shown in FIG. 16.
$D = 2.075$ in.
and
$d = 1.985$ in.
from which
$D_0^2 = 3.581$ in$^2$
$D \cdot d = 4.118$ in$^2$
$D/d = 1.045$
$D_0^2/Dd = 0.869$ in.
$D_0/D = 0.912$ in.
and
$D_0/d = 0.953$ in.

Since the transverse stress in the bar is practically zero, Eq. 14 gives
$\sigma_3/\tau_0 = 0.045M$
and Eq. 15 gives
$\sigma_3/\tau_0 = (2 \times 3/\sqrt{2})(0.131) - (M^2/2\sqrt{2})(0.045)^2.$
From these equations M is found to be 10.5 and $\sigma_3/\tau_0 = 0.473$.

Figure 15:
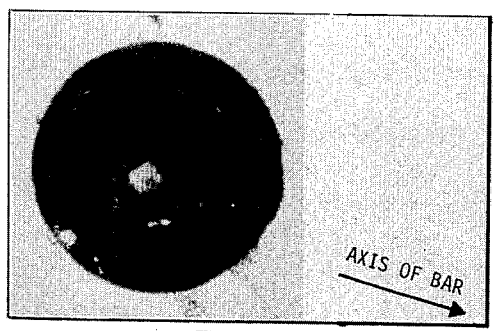
Figure 17:
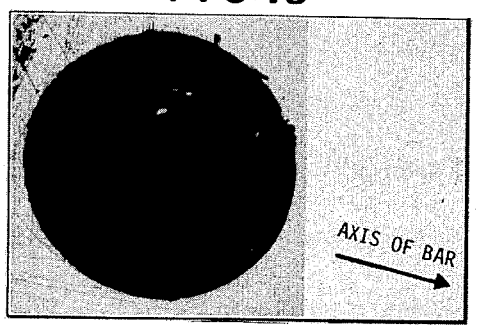

In order to check these values another person measured the diameters and obtained the values shown below. The photograph of the dent in the unstressed bar is shown in FIG. 15 and that of the dent in the stressed bar in FIG. 17.
$D_0 = (1.905 \text{ and } 1.920) \ 1.912$ in. average
$D = 2.085+$
$d = 2.000$
from which
$D_0^2 = 3.658,$
$Dd = 4.170$
$D_0^2/Dd = 0.877$ and $(D/d - 1) = 0.043$
$D_0/D = 0.917$ $D_0/d = 0.956$
from which
$\sigma_3/\tau_0 = 0.043M$
and
$\sigma_3/\tau_0 = (2 \times 3/\sqrt{2})(0.123) - (M^2/2\sqrt{2})(0.043)^2$
The value of M is found to be 10.5
and
$\sigma_3/\tau_0 = 0.451$
The value of $\tau_0$ is found from tension and compression tests, as indicated in FIG. 12 to be 53,000 psi.
From observer No. 1
  $M = 10.5$ and the sresss measured with the total stress gage
  $\sigma_3 = 0.473 \times 53,000 = 25,000$ psi.
From observer No. 2
  $M = 10.5$ and
  $\sigma_3 = 0.451 \times 53,000 = 24,000$ psi.

The bar was then stressed to 54,000 psi tensile stress and the diameters measured. It was found that the dents in the material stressed to this value were so large that they exceeded the polished portion of the diamond; therefore, no valid readings were obtained.

B. COMPRESSION

Two compressive stress values were used. As determined from deflection data these stresses were
  Case I — 29,600 psi
and
  Case II — 48,800 psi Case I The values of the measured diameters for zero stress and for the stressed material were measured from the microscope and camera set the same. However, the magnification was different for this series of measurements than for the tensile stresses, but again the magnification was cancelled out.

Figure 18:
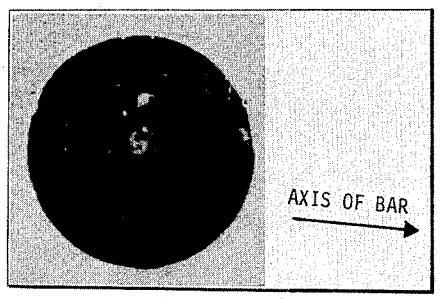
Figure 19:

For Case I the measured values are
Nominal Compressive Stress $\sigma_2 = -29,600$ psi The photograph of the dent in the unstressed bar is shown in FIG. 18 and the photograph of the dent in the stressed bar is shown in FIG. 19.
$D_0 = (1.795 \text{ and } 1.785) \ 1.790$ avg.
$D = 1.750$
$d = 1.670$
$D_0^2 = 3.204$
$Dd = 2.919$
$D^2/Dd = 1.098; D_0/D = 1.023$
$D/d = 1.048; D_0/d = 1.072$
from which $M = 10.5$ and $\sigma_2/\tau_0 = -0.505$. The stress measured with the Total Stress Gage is $-0.505 \times 53,000 = -26,800$ psi.

Case II

Figure 20:
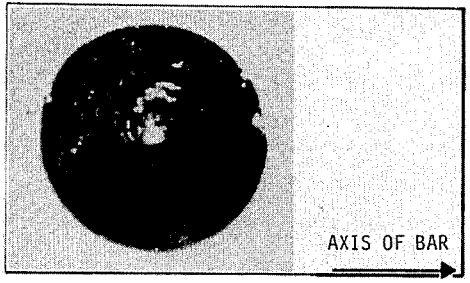
Figure 21:
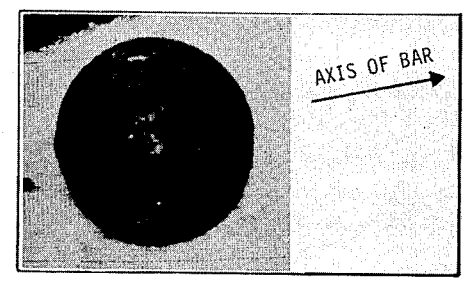
Figure 22:
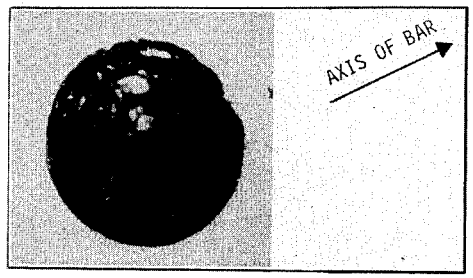

The measured values are
Nominal Compressive Stress $\sigma_2 = -48,800$ psi.
A new photograph of the dent in the unstressed bar is shown in FIG. 20. Photographs of two separate dents in the stressed bar are shown in FIGS. 21 and 22.
$D_0 = (1.740 \text{ and } 1.720) \ 1.730$ avg.
$D = 1.675$
$d = 1.545$
$D_0^2 = 2.99$
$Dd = 2.60$
$D_0^2/Dd = 1.150$
$D_0/D = 1.032$
$D/d = 1.084$
$D_0/d = 1.120.$ from which $M = 10.7$ and $\sigma_2 = 0.907\, \tau_0$. The stress measured with the Total Stress Gage is $-0.907 \times 53,000 = -48,100$ psi.

SUMMARY RESULTS

From these calibration tests using a conical diamond with a 135° apex angle, the values of the constant M ranged from 10.5 to 10.7.

The values of measured stresses are

| Measured by Deflection of Test bar | Measured by Total Stress Gage |
|---|---|
| By observer No. 1 | |
| 22,000 psi tension | 25,000 psi tension |
| By observer No. 2 | |
| 22,000 psi tension | 24,000 psi tension |
| By observer No. 1 | |
| −29,600 psi compression | −26,800 psi |
| −48,800 psi compression | −48,100 psi |

Analysis indicates that with a diamond indentor point with a 160° apex angle the value of M would be only on the order of 6 to 7, meaning a greater sensitvity.

While the profilometer 13 is shown as a microscope 11 and camera 12, it is to be understood that the profilometer may be an optical or electronic scanner which mesures automatically the maximum and minimum diameters and the quantities $(D/d-1)$ and $(1-D_0^2/Dd)$. Also, a scale or grid (radii and concentric circles) mounted in the objective lens of eyepieces 24 so that it will be superimposed on the indentation I for rapid calculation of D and d.

While specific embodiments of the invention have been disclosed herein, it is to be understood that full use of modifications, substitutions and equivalents may be made without departing from the scope of the invention.

I claim:

1. In a method of determining the stresses at a selected point in a first solid body existing adjacent the surface of said body, the steps of pressing an instrument inwardly from said surface into said first solid body with sufficient force to deform permanently the solid body and thereby create a first crater in its surface, and thereafter removing the instrument from the deformed portion of said solid body to ascertain the dimensions and orientation of said first crater, creating a second crater under substantially identical conditions in the surface of a second solid body of the same material and same hardness to said first solid body and in which the stresses are known, and comparing the dimensions of said two craters for ascertaining the magnitude, sense and direction of the principal stresses in said first solid body.

2. The method set forth in claim 1 wherein the steps of ascertaining the amount and orientation of the first crater includes photographing both of said craters perpendicular to the axes of both craters and under identical conditions and measuring the differences between the maximum and minimum diameters of the rims of said craters depicted in the resulting photographs.

3. The method set forth in claim 1 wherein the two principal stresses are compared according to the following formulae:

$$(\sigma_3 - \sigma_2)/\tau_0 = M\,(D/d - 1)$$

$$(\sigma_3 + \sigma_2)/2\,\tau_0 = 3/\sqrt{2}\,(1 - D_0^2/Dd) - (M^2/4\sqrt{2})\,(D/d - 1)^2$$

where $\sigma_3$ = algebraic maximum stress in the surface of the material, in direction of $D$ in the first body $\sigma_2$ = stress at right angle to $\sigma_3$ in the surface of the material of the first body $D$ = maximum diameter of the rim in the first body $D_0$ = diameter of the rim in the second body where stress is known to be zero $d$ = minimum diameter of indentation in the first body $\tau_0$ = shear flow strength of material $M$ = a calibration consant.

4. The method set forth in claim 1 wherein said craters are initially conical and have apex angles of from 135° to 160°.

5. The method set forth in claim 1 wherein the surface of said first solid body is polished in an area of said selected point.

6. The method set forth in claim 1 wherein said instrument initially creates a circular crater.

7. The method set forth in claim 1 wherein said instrument initially creates a square crater.

8. The method set forth in claim 1 wherein said instrument initially creates a hemispherical crater.

9. The method set forth in claim 1 wherein said instrument initially creates a cone shaped crater.

10. The method set forth in claim 1 wherein the instrument has a substantially symetrical end for projecting into and creating said first crater in said first body.

11. The method set forth in claim 10 wherein said surface is substantially flat and said first crater is created by moving the instrument along a path perpendicular to said surface.

12. An instrument for measuring stress comprising an indentor and a profilometer, said indentor including a base, a frame, a yieldable fulcrum carried by said frame, a plunger carried by said fulcrum in a position normal to the surface of a solid body to be measured, an indicator for detecting the extent of force on said plunger and means for moving said plunger with respect to said base, said indentor and said profilometer being adapted to be carried by said base and being selectively moveable into registry with the same axis normal to the surface of said solid body.

13. An instrument as in claim 12 wherein said profilometer includes a microscope and a camera mounted for taking pictures through said microscope.

14. An instrument as in claim 12 including a dial gage carried by said frame and biasing means for biasing said plunger, said dial gage indicating the amount of force of said plunger with respect to said frame.

15. A method of determining stresses in metals comprising, forming an indentation with a circular indentor in the surface of a first metal specimen having unknown stresses to obtain a first indentation response, indenting, with an identical indentor, a metal specimen having known stresses to obtain a second indentation response, and comparing the length of the maximum and minimum diameters of said first indentation response to the average diameter of the second indentation response.

16. In a method of determining the stresses at a selected point in a first solid body existing adjacent the the surface of said body, said first solid body having stresses therein, the steps of pressing an instrument inwardly from said surface into said first body after the body has been stressed and with sufficient force to deform permanently the solid body and thereby create a first crater in its surface, and thereafter removing the instrument from the deformed portion of said solid body, creating a second crater under substantially identical conditions in the surface of a second solid body of the same material and hardness to said first solid body and in which the stresses are known, and obtaining the magnitude of the principal stresses in said first solid body by physical measuring and comparing the diameters of the rims of said two craters.

* * * * *